(12) United States Patent
Humburg et al.

(10) Patent No.: US 11,097,598 B2
(45) Date of Patent: Aug. 24, 2021

(54) COMBUSTION AIR BLOWER

(71) Applicant: Eberspächer Climate Control Systems GmbH & Co. KG, Esslingen (DE)

(72) Inventors: Michael Humburg, Göppingen (DE); Hans Jensen, Dettingen unter Teck (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 155 days.

(21) Appl. No.: 16/287,073

(22) Filed: Feb. 27, 2019

(65) Prior Publication Data
US 2019/0263224 A1 Aug. 29, 2019

(30) Foreign Application Priority Data

Feb. 28, 2018 (DE) .................. 10 2018 104 517.4

(51) Int. Cl.
| | |
|---|---|
| *B60H 1/12* | (2006.01) |
| *F04D 25/06* | (2006.01) |
| *F04D 29/40* | (2006.01) |
| *F04D 29/60* | (2006.01) |
| *F04D 29/42* | (2006.01) |
| *F04D 29/08* | (2006.01) |
| *B60K 13/04* | (2006.01) |
| *B60H 3/06* | (2006.01) |
| *B60H 1/22* | (2006.01) |

(Continued)

(52) U.S. Cl.
CPC ............. *B60H 1/12* (2013.01); *B60H 1/2212* (2013.01); *B60H 3/0608* (2013.01); *B60K 13/04* (2013.01); *F04D 23/008* (2013.01); *F04D 25/0693* (2013.01); *F04D 29/083* (2013.01); *F04D 29/403* (2013.01); *F04D 29/4226* (2013.01); *F04D 29/601* (2013.01); *F04D 29/701* (2013.01); *B60H 2001/2271* (2013.01); *B60H 2001/2281* (2013.01); *F23N 2241/14* (2020.01)

(58) Field of Classification Search
None
See application file for complete search history.

(56) References Cited

U.S. PATENT DOCUMENTS 1,898,859 A * 2/1933 Thorp .................. B60H 3/0608
454/152
2,240,368 A * 4/1941 Le Fevre ............. B60H 3/0616
96/138

(Continued)

FOREIGN PATENT DOCUMENTS

| CA | 2731292 A1 | 1/2010 |
| DE | 43 45 056 A1 | 7/1995 |

(Continued)

*Primary Examiner* — Steven B McAllister
*Assistant Examiner* — Daniel E. Namay
(74) *Attorney, Agent, or Firm* — McGlew and Tuttle, P.C.

(57) ABSTRACT

A combustion air blower, especially side channel blower, for a fuel-operated vehicle heater, includes a blower housing (38). An air flow space (44), through which combustion air being fed can flow, is formed in the blower housing (38). Air flowing over an inlet area (55) into the air flow space (44) flows to a feed area enclosing a feed wheel (48). At least one hydrocarbon storage element (70, 88) is formed in the air flow space (44), for storing gaseous hydrocarbon present in the air flow space (44).

18 Claims, 3 Drawing Sheets

(51) Int. Cl.
     F04D 23/00    (2006.01)
     F04D 29/70    (2006.01)

(56) References Cited

U.S. PATENT DOCUMENTS

| | | | | |
|---|---|---|---|---|
| 2,752,842 | A * | 7/1956 | Sumner | B60H 1/3202 454/148 |
| 3,174,682 | A * | 3/1965 | Wilfert | F04D 29/4226 415/119 |
| 3,669,429 | A * | 6/1972 | Dew | A24B 1/02 432/222 |
| 4,492,151 | A * | 1/1985 | Mattei | B60H 3/0608 454/70 |
| 4,629,479 | A * | 12/1986 | Cantoni | F24F 13/28 96/55 |
| 5,192,346 | A * | 3/1993 | Kowalczyk | B01D 46/0086 96/135 |
| 5,346,391 | A | 9/1994 | Fullemann et al. | |
| 9,802,462 | B2 | 10/2017 | Eger et al. | |
| 2004/0007196 | A1 | 1/2004 | Young et al. | |
| 2006/0000593 | A1 * | 1/2006 | Schlecht | B60H 1/032 165/202 |
| 2011/0114741 | A1 | 5/2011 | Kaindl | |
| 2014/0008449 | A1 * | 1/2014 | Eger | B60H 1/2206 237/12.3 C |
| 2017/0043647 | A1 * | 2/2017 | Vergamini | B60H 1/3202 |

FOREIGN PATENT DOCUMENTS

| | | |
|---|---|---|
| DE | 20 2008 000 097 U1 | 10/2008 |
| DE | 10 2012 211640 A1 | 10/2013 |
| JP | 2007218506 A | 8/2007 |
| WO | 00/06288 A1 | 2/2000 |

\* cited by examiner

COMBUSTION AIR BLOWER

CROSS REFERENCE TO RELATED APPLICATIONS

This application claims the benefit of priority under 35 U.S.C. § 119 of German Application 10 2018 104 517.4, filed Feb. 28, 2018, the entire contents of which are incorporated herein by reference.

TECHNICAL FIELD

The present invention pertains to a combustion air blower, which can be used, for example, to feed the air needed for combustion into a combustion chamber of the vehicle heater in a fuel-operated vehicle heater.

BACKGROUND

There generally is a requirement in motor vehicles, especially also in motor vehicles equipped with fuel-operated vehicle heaters, that only a very limited quantity of hydrocarbon of, for example, 0.05 g, may be discharged into the environment during a so-called SHED test in the inoperative state of such a vehicle, i.e., with both the motor and the vehicle heater shut off. Since fuel-operated vehicle heaters are frequently equipped with a porous evaporator medium, which adsorbs liquid fuel and releases it in a gaseous state into a combustion chamber, the problem is, in general, that even when the combustion operation has been stopped, liquid fuel is still present in the evaporator medium and evaporates above all from an evaporator medium still heated following a preceding combustion operation, i.e., it is released in a gaseous state. There is, in principle, a risk in this connection that gaseous hydrocarbon is discharged to the outside in such a quantity that the regulatory requirements cannot be met via a combustion air blower arranged upstream of a combustion chamber and consequently also of such an evaporator medium acting as a source for gaseous hydrocarbon when a motor vehicle has been stopped and the vehicle heater has been deactivated.

SUMMARY

An object of the present invention is to provide a combustion air blower, especially a side channel blower, for a fuel-operated vehicle heater, with which the discharge of gaseous hydrocarbon into the environment can be prevented.

This object is accomplished according to the present invention by a combustion air blower, especially side channel blower, for a fuel-operated vehicle heater, comprising a blower housing, wherein an air flow space, through which combustion air being fed can flow, is formed in the blower housing, and air flowing into the air flow space flows over an inlet area to a feed area comprising a feed wheel, wherein at least one hydrocarbon storage element is arranged in the air flow space for storing gaseous hydrocarbon present in the air flow space.

It is ensured by the provision of at least one hydrocarbon storage element in the volume in which air is fed in the direction of a combustion chamber during the combustion operation that gaseous hydrocarbon entering this volume when the vehicle heater is deactivated and the combustion air blower is correspondingly deactivated is not discharged to the outside via the combustion air blower, but is adsorbed in the at least one hydrocarbon storage element. If a vehicle heater and hence also the combustion air blower are again put into operation, air not containing essentially any hydrocarbon will again flow through this volume in the direction of the vehicle heater. Air will now also flow around the hydrocarbon storage element storing the hydrocarbon and the hydrocarbon still being stored at first is removed in the direction of the vehicle heater or the combustion chamber thereof. Not only is thus the hydrocarbon emission of a fuel-operated vehicle heater via a combustion air blower prevented essentially completely from occurring, but it is also ensured that hydrocarbon, which is still present in a vehicle heater after the end of the combustion operation and is discharged in the gaseous form in the direction of the combustion air blower, is introduced into the combustion process and a more efficient use of the fuel being fed into the vehicle heater can thus be guaranteed.

The blower housing may comprise a bottom wall and a circumferential wall enclosing the air flow space. The blower housing may further have a motor housing area (a motor housing portion, a motor housing section) enclosed in at least some areas by the air flow space with a circumferential wall and with a bottom wall, and the circumferential wall of the blower housing may be configured as an integral component with the circumferential wall of the motor housing area, i.e., as a component provided as a material block.

To make it possible to provide a comparatively large surface for the adsorption of gaseous hydrocarbon, it is proposed that the circumferential wall of the blower housing be covered by at least one hydrocarbon storage element in at least some areas on an inner side facing the air flow space. The circumferential wall of the blower housing is preferably covered essentially completely by at least one hydrocarbon storage element.

The surface intended for adsorbing hydrocarbon can be further enlarged by the circumferential wall of the motor housing area or/and the bottom wall of the motor housing area being covered by at least one hydrocarbon storage element in at least some areas on an outer side facing the air flow space. The motor housing area is covered essentially completely by at least one hydrocarbon storage medium in this case as well.

Further, the bottom wall of the blower housing may also be covered by at least one hydrocarbon storage element in at least some areas on an inner side facing the air flow space, and the bottom wall of the blower housing may in turn be covered essentially completely by at least one hydrocarbon storage element in an especially advantageous variant.

In one embodiment, which can be configured in a structurally simple manner and is especially efficient concerning the storage of hydrocarbon present in the gaseous state, a hydrocarbon storage insert inserted into the air flow space may provide a hydrocarbon storage element, wherein the hydrocarbon storage insert may comprise a first insert bottom wall covering the bottom wall of the blower housing, an insert outer circumferential wall covering the circumferential wall of the blower housing, an insert inner circumferential wall covering the circumferential wall of the motor housing area, and a second insert bottom wall covering the bottom wall of the motor housing area.

The configuration can be made very simple by the hydrocarbon storage insert being provided with the first insert bottom wall, with the insert outer circumferential wall, with the insert inner circumferential wall and with the second insert bottom wall as a material body.

To make it possible to feed combustion air to the feed area of the combustion air blower when the hydrocarbon storage element is inserted into the air flow space, it is proposed that an air flow volume, through which combustion air being fed can flow, be formed in the hydrocarbon storage insert. In particular, provisions may be made in this connection for providing an inlet opening for combustion air being fed in the insert outer circumferential wall, or/and for providing an outlet opening for combustion air being fed in the first insert bottom wall.

A closing element closing off the air flow space may be provided for the complete closure of the air flow space at an end area of the circumferential wall of the blower housing which end area faces away from the bottom wall of the blower housing. The closing element may also be covered by at least one hydrocarbon storage element in at least some areas on an inner side facing the air flow space in order to enlarge the surface available for adsorbing gaseous hydrocarbon.

When using a hydrocarbon storage insert, it is further proposed that the air flow volume be defined by the at least one hydrocarbon storage element covering the closing element in at least some areas at an end area of the insert outer circumferential wall, which end area is located at a spaced distance from the first insert bottom wall.

According to another aspect of the present invention, which forms an independent aspect of the present invention both in connection with the above-described integration of at least one hydrocarbon storage element into the air flow space, and separated from this aspect of the invention, a housing cover, which covers the feed wheel and defines a feed wheel mounting space with the blower housing, may be carried on the blower housing, wherein a sealing element, which tightly seals the feed wheel mounting space against the discharge of gaseous hydrocarbon in the area in which the housing cover adjoins the blower housing, is arranged between the housing cover and the blower housing. As an alternative or in addition, the discharge of gaseous hydrocarbon from the combustion air blower can thus be prevented in this area as well.

If the combustion air blower is configured in the manner of a so-called side channel blower, the feed area may comprise in the bottom wall of the blower housing a feed duct, which is ring-shaped, is covered by the feed wheel and is open to an outer side facing away from the air flow space. An inlet opening, via which the combustion air flowing through the air flow space can enter into the feed duct, is associated with such a feed duct. Under the feed effect of the rotating feed wheel, this air is fed along the feed duct to an outlet opening separated from the inlet opening by an interruptor area. The combustion air can then be discharged in the direction of the chamber of a vehicle heater via this outlet opening.

It is further proposed in case of such a configuration of the combustion air blower that the sealing element be arranged such that it encloses the feed duct in a ring-shaped manner on an outer side of the bottom wall of the blower housing.

At least one hydrocarbon storage element may be made of a material containing activated carbon in an embodiment that can be manufactured in a cost-effective manner and guarantees an efficient storage of hydrocarbon discharged in the gaseous state.

The present invention further pertains to a fuel-operated vehicle heater, comprising a burner area, a fuel pump feeding liquid fuel to the burner area, as well as a combustion air blower configured according to the present invention.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
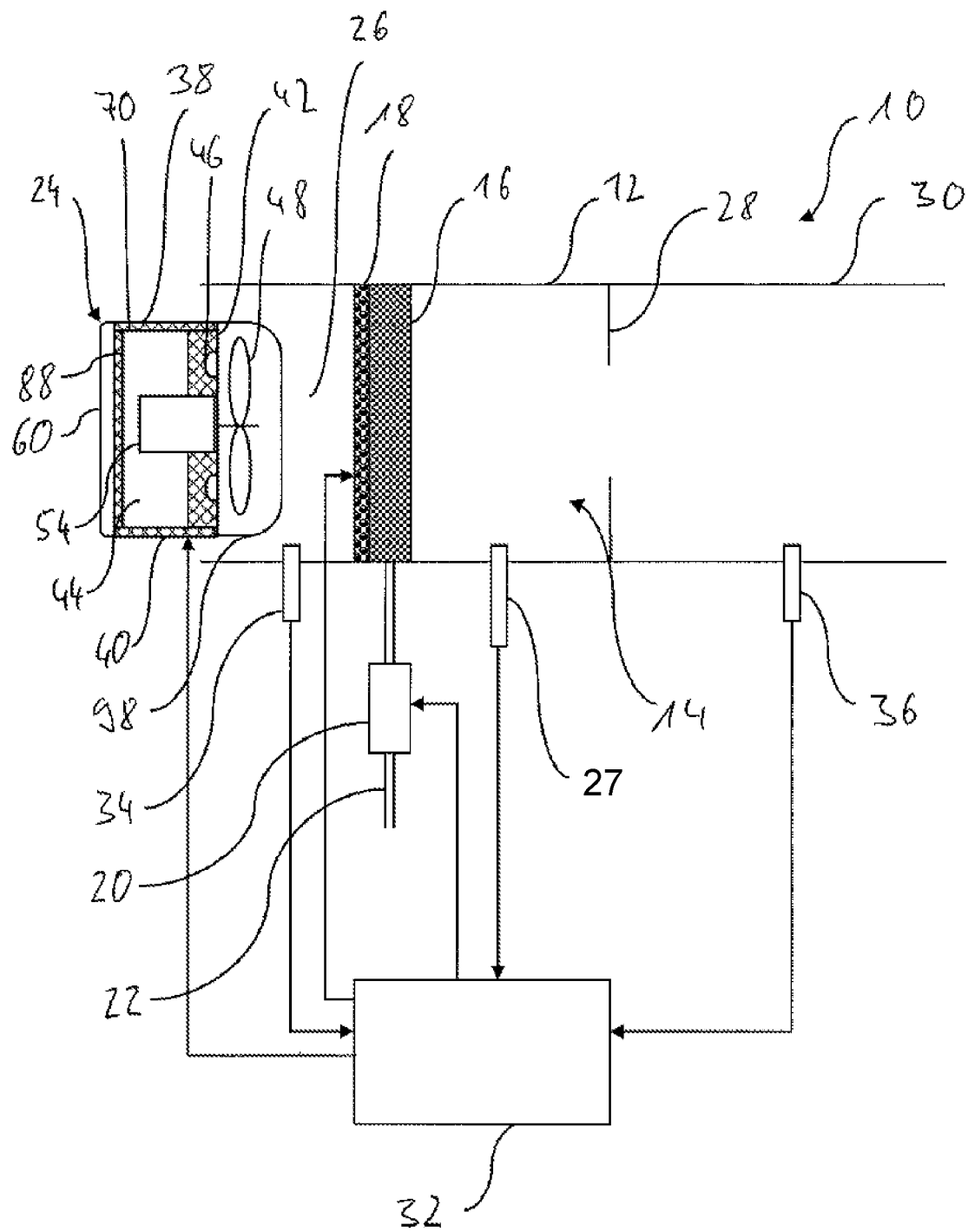
FIG. 1 is a schematic view of a fuel-operated vehicle heater with a combustion air blower according to the principles of the present invention.

Referring to the drawings, in a perspective view, FIG. 1 shows the configuration of a fuel-operated vehicle heater generally designated by 10. The vehicle heater 10 comprises a burner area 12 with a combustion chamber 14 formed in a combustion chamber housing. If the burner area 12 is configured as a vaporizing burner, a porous evaporator medium 16, which may be configured, for example, as metal mesh, metal fabric, foamed ceramic or the like, is provided at a bottom area defining the combustion chamber 14. An electrically energizable heater 18 may be associated with the porous evaporator medium 16 to support the evaporation of the fuel. The fuel necessary for the combustion is introduced into the porous evaporator medium via a fuel line 22 by means of a fuel pump 20, for example, a feed pump. The liquid fuel spreads out in the evaporator medium 16 under capillary feed effect and is released as fuel vapor, i.e., in the gaseous state, into the combustion chamber 14.

The combustion air needed for combustion is fed to the combustion chamber 14 by a combustion air blower generally designated by 24. The combustion air released by the combustion air blower 24 reaches a space 26 generally designated as plenum upstream of the combustion chamber 14 and enters into the combustion chamber 14 via a plurality of air inlet pipes, which are provided, for example, in a circumferential wall defining the combustion chamber 14 or/and via an air inlet pipe provided at the bottom area. The mixture of combustion air and fuel, which is formed in the combustion chamber, is ignited, for example, by an electrically energizable ignition element 27, for example, a glow plug. The waste gases formed during the combustion leave the combustion chamber 14 via a flame diaphragm 28 and flow along a flame tube 30 in the direction of a heat exchanger area, not shown.

The vehicle heater 10 further has an actuating device generally designated by 32. The actuating device 32 comprises one or more processors and associated memory. The actuating device 32 controls the operation of the fuel pump 20 and of the combustion air blower 24 as well as of the electrically energizable heater 18. Information relevant for the operation of the vehicle heater 10 may be sent for this purpose to the actuating device 32 by different sensors, e.g., a pressure sensor 34 and a temperature sensor 36.

It should be noted that the schematic configuration of the vehicle heater 10 was described above on the basis of an example and the vehicle heater 10 may differ from the above-described configuration shown in many different aspects.

The combustion air blower 24 is generally configured as a so-called side channel blower in such a fuel-operated vehicle heater. It comprises a blower housing 38, which defines an air flow space 44 with a circumferential wall 40 and with a bottom wall 42. The combustion air to be fed in the direction of the combustion chamber 14 reaches a ring-shaped feed duct 46 formed in the bottom wall 42 via the air flow space 44. This feed duct 46 is covered by a feed wheel 48, shown only schematically, on an outer side of the bottom wall 42, which outer side faces away from the air flow space 44. The air being fed along the feed duct 46 by the feed effect of the rotating feed wheel 48 enters the space 26 and via this the combustion chamber 14 during the feed operation.

Figure 2:
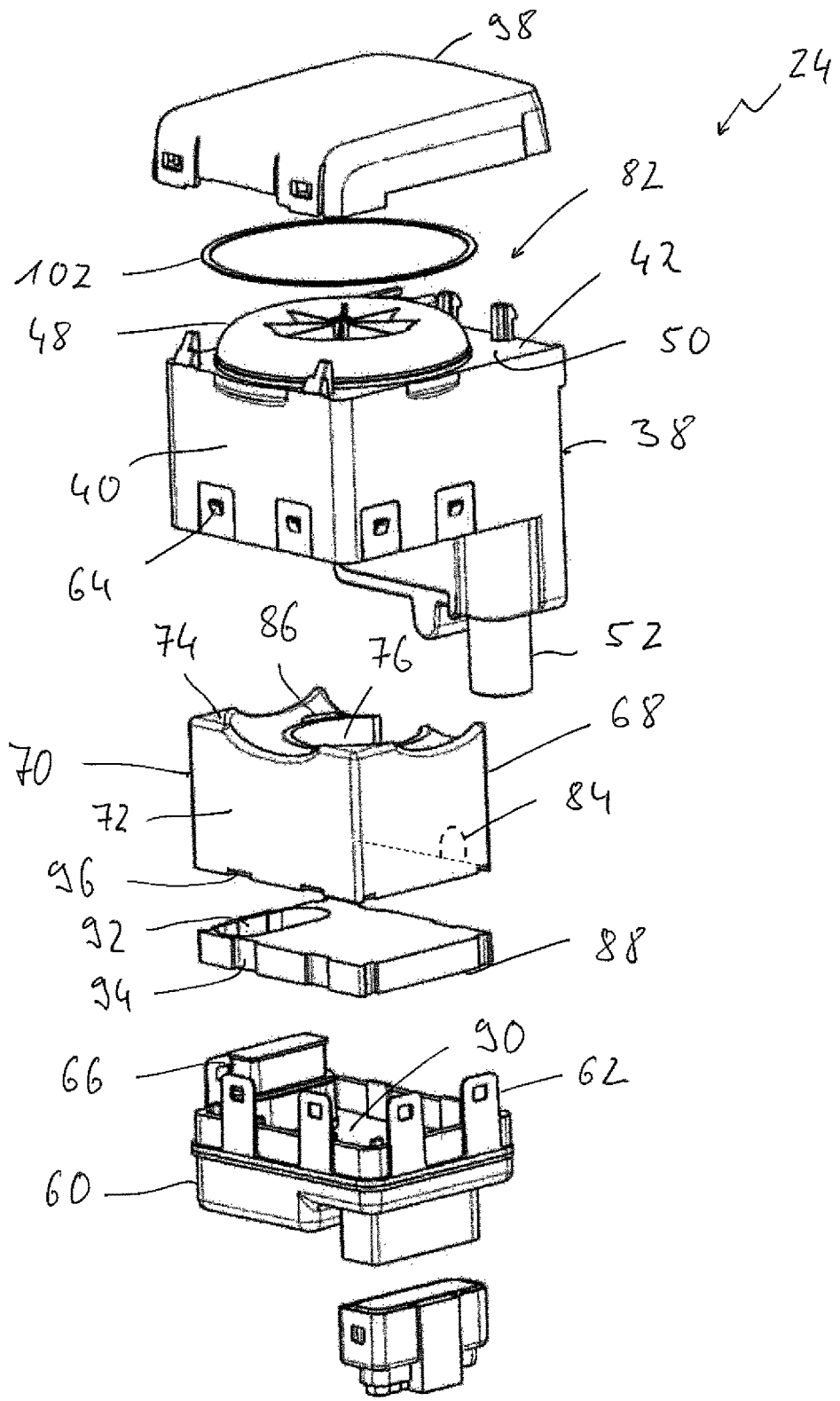
FIG. 2 is a perspective exploded view of a combustion air blower configured according to the principles of the present invention.
Figure 3:
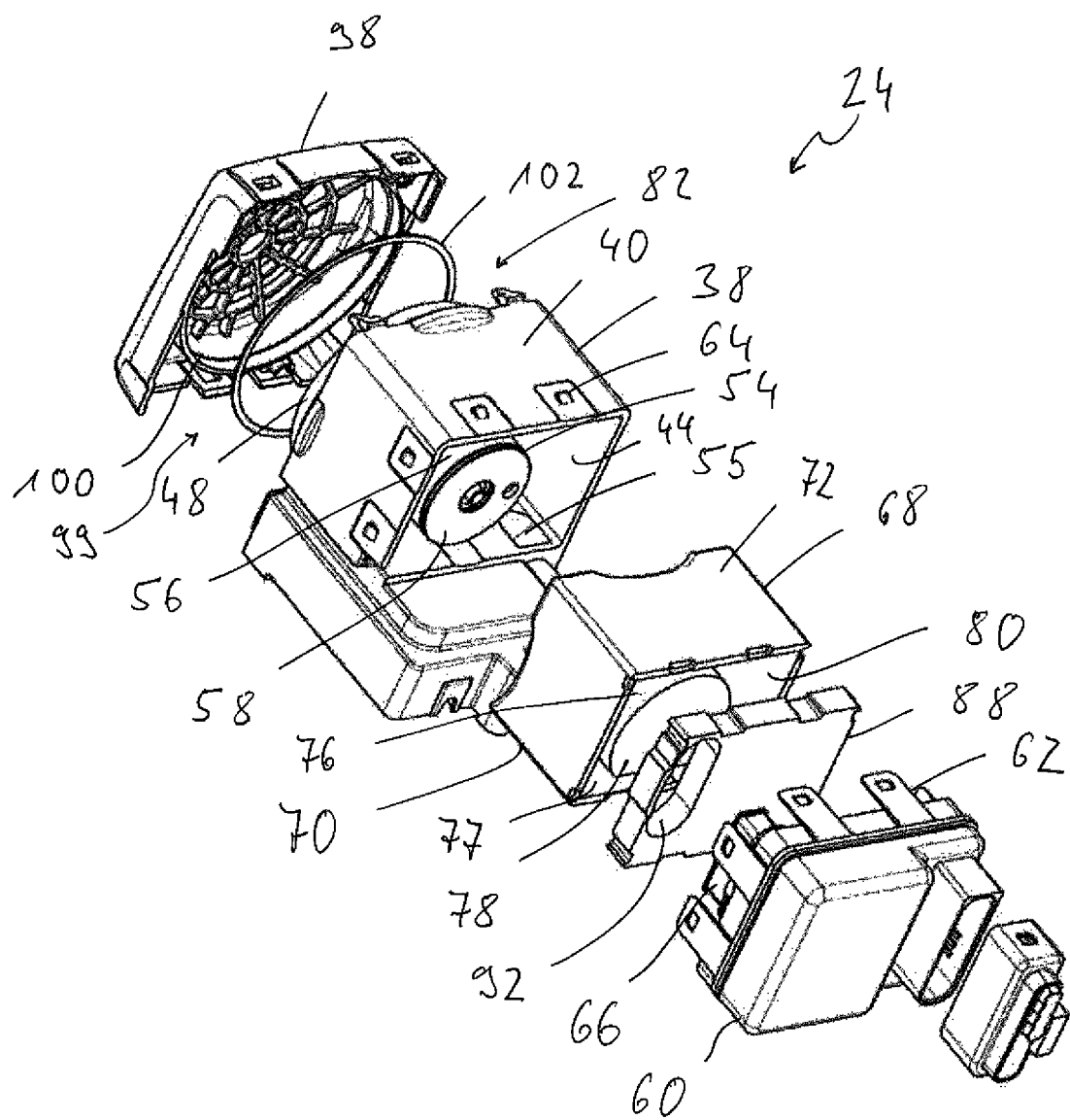
FIG. 3 is an exploded view corresponding to FIG. 2, viewed in another viewing direction.

The configuration of the combustion air blower 24 will be described in more detail below with reference to FIGS. 2 and 3. These figures show the blower housing 38, made, for example, of a metallic material, with its circumferential wall 40 and with its bottom wall 42. The feed duct 46 formed on the outer side 50 of the bottom wall 42 cannot be seen in FIGS. 2 and 3 under the feed wheel 48 covering this feed duct 46. A tubular air inlet pipe 52, which is open to the air flow space 44 formed in the blower housing 38 via an inlet opening 55, which can be seen in FIG. 3 and provides an inlet area for the air flow space 44, is provided in the area of the circumferential wall 40 on one side. The air flowing through the air flow space 44 enters into the feed duct 46 via an opening in the bottom wall 42 of the blower housing 38, which said opening cannot be seen in the figures.

To mount a blower motor driving the feed wheel 48, which motor is generally configured as an electric motor, a motor housing area 54 is provided at the blower housing 38. This motor housing area 54 comprises a circumferential wall 56 as well as a bottom wall 58 provided at the end of the circumferential wall 56, which end faces away from the bottom wall 42 of the blower housing 38. It should be noted that the circumferential wall 56 of the motor housing area 54 may be configured as an integral component, especially as a metal cast part, together with the bottom wall 42 and with the circumferential wall 40 of the blower housing 38. After insertion of the blower motor into the volume area enclosed by the circumferential wall 56 of the motor housing area 54, the bottom wall 58 of the motor housing area 54 can be fixed at the axial end—axially relative to an axis of rotation of a rotor shaft of the blower motor—of the circumferential wall 56 of the motor housing area 54 by, for example, a screw connection, locking or the like.

A closing element, generally designated by 60, is provided in order to also close the air flow space 44 at the end area of the circumferential wall 40 of the blower housing 38, which end area faces away from the bottom wall 42. This closing element 60 may be locked at corresponding locking projections 64 at the circumferential wall 40 by means of a plurality of locking straps 62. The actuating device 32 or at least a part of it, e.g., the part used to actuate the blower motor, may be provided at the closing element 60, and an electrical connection to the blower motor can be established, for example, via an insertion area 66 meshing with the air flow area 44.

With the vehicle heater 10 deactivated and with liquid fuel, i.e., hydrocarbon, still being stored in the porous evaporator medium 16, it is possible, in principle, that, supported, for example, by the residual heat still present, fuel is evaporating and reaches the combustion air blower 24 and hence especially also the area of the air flow space 44 via the flow path provided per se for introducing combustion air into the combustion chamber 14. Such fuel or hydrocarbon present now in the gaseous state could escape to the environment via the air inlet pipe 52.

To prevent this, a hydrocarbon storage insert, which is generally designated by 68 and which forms a hydrocarbon storage element 70, is provided in association with the combustion air blower 24. The hydrocarbon storage insert 68 is made, for example, with activated carbon-containing material and has, in adaptation to the shape of the blower housing 38, an insert outer circumferential wall 72 as well as a first insert bottom wall 74. FIG. 2 shows that the first insert bottom wall 74 is configured such that this first insert bottom wall 74 has a shape adapted to the contour of the bottom wall 42 for providing the feed duct 46 and it can thus cover the bottom wall 42 at this insert bottom wall 74 such that it is in contact with it over essentially the entire surface. The insert outer circumferential wall 72 is configured or shaped such that it can cover such that it is essentially in contact over the entire surface on an inner side 77 of the circumferential wall 40, which inner side faces the air flow space 44. In association with the motor housing area 54, the hydrocarbon storage insert 68 has an insert inner circumferential wall 76, which extends away from the first insert bottom wall 74 and which covers the circumferential wall 56 of the motor housing area 54 such that it encloses it essentially completely or can be in contact with it. To cover the bottom wall 58 of the motor housing area 54, the hydrocarbon storage insert 68 has a second insert bottom wall 78. The air flow space 44 formed in the blower housing 38 in the interior of the blower housing 38 is thus lined essentially completely by the hydrocarbon storage insert 68, which provides in its interior an air flow volume 80 for the air flowing to a feed area 82 of the combustion air blower 10, which feed area is provided essentially by the feed duct 46 leading into the feed wheel 48. To allow the entry of air into the air flow volume 80 in the area of the inlet opening 55, a corresponding inlet opening 84 may also be provided in the insert outer circumferential wall 72. Further, an outlet opening 86 allowing the entry of air into the feed duct 46 may also be provided in the first insert bottom wall 74.

To also close the air flow space 44 or the air flow volume 80 at the end of the circumferential wall 40, which end faces away from the bottom wall 42 of the blower housing 38, in such a manner that the possibility of storing hydrocarbon is created, another, plate-like hydrocarbon storage element 88 is provided. This is configured such that it can cover the closing element 60 on the inner side 90 thereof, which inner side faces the air flow space 44, essentially completely, and that it makes possible the passage of the insertion areas 66 meshing with the air flow space 44 for the electrical contacting of the blower motor with an opening 92. To guarantee adaptation to the inner contour of the closing element 60, recesses 94, 96, with which corresponding bulges can also mesh, for example, at the closing element 60, may be provided in the two hydrocarbon storage elements 70, 88.

An efficiently acting, very large surface is provided for adsorbing gaseous hydrocarbon by the provision of hydrocarbon storage elements, which line the blower housing 38 essentially completely. The discharge of gaseous hydrocarbon into the environment can thus be prevented to the greatest extent possible. When the feed operation is resumed, the combustion air to be fed in the direction of the combustion chamber 14 flows through the air flow volume 80 and removes in the process the hydrocarbon still present at first at the hydrocarbon storage elements 70, 88 and introduces this into the combustion process. Since the hydrocarbon storage insert 68 is arranged in the air flow volume 44 such that it covers the surfaces of the blower housing 38, which surfaces enclose this, but it does not otherwise block the interior of the blower housing 38 against flow, no additional flow resistance is essentially generated for the combustion air to be fed due to the hydrocarbon storage insert 68 being provided in the air flow volume 44.

The hydrocarbon storage elements 70, 88 may consist each of, for example, a body pressed from an activated carbon material. In an alternative type of embodiment, the hydrocarbon storage elements may comprise each a carrier body, which is made with porous walls and provides a cavity for receiving activated carbon material. A carrier body made, for example, of a plastic material may be coated with activated carbon material on its surface in another alternative type of embodiment.

There is a generally unavoidable, gap-like intermediate space between the feed wheel 48 and the outer side 50 of the bottom wall 42 of the blower housing 38. This intermediate space is also kept as small as possible to avoid pressure losses. It is likewise impossible to rule out the possibility that evaporated hydrocarbon, which is consequently in the gaseous state, will also be discharged to the outside via such a gap-like intermediate space when the combustion air blower 24 has been stopped and the vehicle heater 10 has been deactivated. To provide am essentially gas-tight closure here as well, a housing cover 98 covering the feed wheel 48 is provided. This cover 98 can be fixed on the blower housing 38 by locking. A sealing element 102 enclosing the feed wheel 48 and also the feed duct 46 in a ring-shaped manner is positioned between the outer side 50 of the bottom wall 42 and a ring-shaped sealing area 100 of the housing cover 98. This sealing element 102 thus provides for a tight closure of a feed wheel mounting space 99 against the discharge of gaseous hydrocarbon where the housing cover 98 adjoins the bottom wall 42 of the blower housing 38.

It should finally be noted that the combustion air blower described above with reference to FIGS. 1 through 3 may be varied in many different aspects without abandoning the principles of the present invention. Thus, the hydrocarbon storage insert could have, for example, a multipart configuration or/and be configured such that not all the surfaces enclosing the air flow space are covered. It would also be possible to embody or not to embody the two aspects of providing one or more hydrocarbon storage elements in the area of the air flow space, on the one hand, and of providing a gas-tight closure in the area of the housing cover, on the other hand, each separately from each other on a combustion air blower.

While specific embodiments of the invention have been shown and described in detail to illustrate the application of the principles of the invention, it will be understood that the invention may be embodied otherwise without departing from such principles.

What is claimed is:

1. A combustion air blower for a fuel-operated vehicle heater, the combustion air blower comprising:
   a blower housing forming an air flow space, through which air flow space combustion air being fed flows, the blower housing having an inlet area into the air flow space and a feed area, wherein combustion air being fed flows from the inlet area to the feed area;
   a feed wheel associated with the feed area; and
   at least one hydrocarbon storage element arranged in the air flow space for storing gaseous hydrocarbon present in the air flow space, wherein:
   the blower housing comprises: a blower housing bottom wall; and a blower housing circumferential wall, the blower housing bottom wall and the blower housing circumferential wall cooperating to at least partially enclose the air flow space, wherein the blower housing circumferential wall is covered, on an inner side of the blower housing facing the air flow space, in at least some areas, by the at least one hydrocarbon storage element; or
   the blower housing comprises: a blower housing bottom wall; and a blower housing circumferential wall, the blower housing bottom wall and the blower housing circumferential wall cooperating to at least partially enclose the air flow space, wherein the blower housing bottom wall is covered in at least some areas by the at least one hydrocarbon storage element on an inner side facing the air flow space; or
   the blower housing comprises: a blower housing bottom wall; and a blower housing circumferential wall, the blower housing bottom wall and the blower housing circumferential wall cooperating to at least partially enclose the air flow space, wherein the blower housing circumferential wall is covered, on an inner side of the blower housing facing the air flow space, in at least some areas, by the at least one hydrocarbon storage element and the blower housing bottom wall is covered in at least some areas by the at least one hydrocarbon storage element on an inner side facing the air flow space; or
   the blower housing comprises a motor housing area comprised by: a motor housing circumferential wall and a motor housing bottom wall, said motor housing area being enclosed in at least some areas by the air flow space, wherein the motor housing circumferential wall is covered in at least some areas by the at least one hydrocarbon storage element on an outer side facing the air flow space; or
   the blower housing comprises a motor housing area comprised by: a motor housing circumferential wall and a motor housing bottom wall, said motor housing area being enclosed in at least some areas by the air flow space, wherein the motor housing bottom wall is covered in at least some areas by the at least one hydrocarbon storage element on an outer side facing the air flow space; or
   the blower housing comprises a motor housing area comprised by: a motor housing circumferential wall and a motor housing bottom wall, said motor housing area being enclosed in at least some areas by the air flow space, wherein the motor housing circumferential wall and the motor housing bottom wall are covered in at least some areas by the at least one hydrocarbon storage element on an outer side facing the air flow space; or
   the blower housing comprises: a blower housing bottom wall; a blower housing circumferential wall, the blower housing bottom wall and the blower housing circumferential wall cooperating to at least partially enclose the air flow space and a motor housing area comprised by: a motor housing circumferential wall and a motor housing bottom wall, said motor housing area being enclosed in at least some areas by the air flow space, wherein the blower housing circumferential wall is covered, on an inner side of the blower housing facing the air flow space, in at least some areas, by the at least one hydrocarbon storage element and the blower housing bottom wall is covered in at least some areas by the at least one hydrocarbon storage element on an inner side facing the air flow space, and wherein the motor housing circumferential wall and the motor housing bottom wall are covered in at least some areas by the at least one hydrocarbon storage element on an outer side facing the air flow space.

2. The combustion air blower in accordance with claim 1, wherein the blower housing circumferential wall, on the inner side of the blower housing facing the air flow space, is covered completely by the at least one hydrocarbon storage element.

3. The combustion air blower in accordance with claim 1, wherein the motor housing area is covered completely by the at least one hydrocarbon storage element.

4. The combustion air blower in accordance with claim 1, wherein the bottom wall of the blower housing is covered completely by the at least one hydrocarbon storage element.

5. The combustion air blower in accordance with claim 1, wherein:
the at least one hydrocarbon storage element is comprised by a hydrocarbon storage insert inserted into the air flow space;
the hydrocarbon storage insert comprises a first insert bottom wall covering the blower housing bottom wall, an insert outer circumferential wall covering the blower housing circumferential wall, an insert inner circumferential wall covering the motor housing circumferential wall, and a second insert bottom wall covering the motor housing bottom wall.

6. The combustion air blower in accordance with claim 5, wherein the hydrocarbon storage insert with the first insert bottom wall, with the insert outer circumferential wall, with the insert inner circumferential wall and with the second insert bottom wall is provided as a unitary material body.

7. The combustion air blower in accordance with claim 5, wherein an air flow volume, through which combustion air to be fed can flow, is formed in the hydrocarbon storage insert.

8. The combustion air blower in accordance with claim 7, wherein:
an inlet opening for combustion air to be fed is provided in the insert outer circumferential wall; or
a discharge opening is provided in the insert outer circumferential wall for combustion air being fed; or
an inlet opening for combustion air to be fed is provided in the insert outer circumferential wall and a discharge opening is provided in the insert outer circumferential wall for combustion air being fed.

9. The combustion air blower in accordance with claim 1, further comprising a closing element closing the air flow space, wherein:
the closing element is provided at an end area of the blower housing circumferential wall, which said end area faces away from the blower housing bottom wall;
the closing element is covered by the at least one hydrocarbon storage element in at least some areas on an inner side facing the air flow space.

10. The combustion air blower in accordance with claim 9, further comprising another hydrocarbon storage element comprised of a hydrocarbon storage insert inserted into the air flow space, wherein:
the hydrocarbon storage insert comprises an insert bottom covering the blower housing bottom wall, an insert outer circumferential wall covering the blower housing circumferential wall, an insert inner circumferential wall covering the motor housing circumferential wall, and a second insert bottom wall covering the motor housing area bottom wall; and
an air flow volume is defined by the at least one hydrocarbon storage element, which covers the closing element in at least some areas, at an end area located at a distance from the first insert bottom wall.

11. The combustion air blower in accordance with claim 1, further comprising:
a housing cover, covering the feed wheel and defining a feed wheel mounting space with the blower housing; and
a sealing element arranged between the housing cover and the blower housing, wherein:
the housing cover is carried at the blower housing;
the sealing element seals the feed wheel mounting space, in an area in which the housing cover adjoins the blower housing, against a discharge of gaseous hydrocarbon.

12. The combustion air blower in accordance with claim 11, wherein:
the feed area is provided in a region of the blower housing bottom wall and comprises a ring-shaped feed duct, which feed duct is open towards an outer side facing away from the air flow space and which feed duct is covered by the feed wheel; and
the sealing element is arranged on an outer side of the bottom wall of the blower housing such that the sealing element encloses the feed duct with a ring-shape.

13. The combustion air blower in accordance with claim 1, wherein the feed area is provided in a region of the blower housing bottom wall and comprises a ring-shaped feed duct, which feed duct is open towards an outer side facing away from the air flow space and which feed duct is covered by the feed wheel.

14. The combustion air blower in accordance with claim 1, wherein the at least one hydrocarbon storage element is made with a material containing activated carbon.

15. A fuel-operated vehicle heater, comprising:
a burner area;
a fuel pump for feeding liquid fuel to the burner area;
a combustion air blower connected to the burner area, the combustion air blower comprising:
a blower housing forming an air flow space, through which air flow space combustion air being fed flows, the blower housing having an inlet area into the air flow space and a feed area, wherein combustion air being fed flows from the inlet area to the feed area;
a feed wheel associated with the feed area; and
at least one hydrocarbon storage element arranged in the air flow space for storing gaseous hydrocarbon present in the air flow space; wherein:
the blower housing comprises: a blower housing bottom wall; and a blower housing circumferential wall, the blower housing bottom wall and the blower housing circumferential wall cooperating to at least partially enclose the air flow space, wherein the blower housing circumferential wall is covered, on an inner side of the blower housing facing the air flow space, in at least some areas, by the at least one hydrocarbon storage element; or
the blower housing comprises: a blower housing bottom wall; and a blower housing circumferential wall, the blower housing bottom wall and the blower housing circumferential wall cooperating to at least partially enclose the air flow space, wherein the blower housing bottom wall is covered in at least some areas by the at least one hydrocarbon storage element on an inner side facing the air flow space; or the blower housing comprises: a blower housing bottom wall; and a blower housing circumferential wall, the blower housing bottom wall and the blower housing circumferential wall cooperating to at least partially enclose the air flow space, wherein the blower housing circumferential wall is covered, on an inner side of the blower housing facing the air flow space, in at least some areas, by the at least one hydrocarbon storage element and the blower housing bottom wall is covered in at least some areas by the at least one hydrocarbon storage element on an inner side facing the air flow space; or the blower housing comprises a motor housing area comprised by: a motor housing circumferential wall and a motor housing bottom wall, said motor housing area being enclosed in at least some areas by the air flow space, wherein the motor housing circumferential wall is covered in at least some areas by the at least one hydrocarbon storage element on an outer side facing the air flow space; or the blower housing comprises a motor housing area comprised by: a motor housing circumferential wall and a motor housing bottom wall, said motor housing area being enclosed in at least some areas by the air flow space, wherein the motor housing bottom wall is covered in at least some areas by the at least one hydrocarbon storage element on an outer side facing the air flow space; or the blower housing comprises a motor housing area comprised by: a motor housing circumferential wall and a motor housing bottom wall, said motor housing area being enclosed in at least some areas by the air flow space, wherein the motor housing circumferential wall and the motor housing bottom wall are covered in at least some areas by the at least one hydrocarbon storage element on an outer side facing the air flow space; or the blower housing comprises: a blower housing bottom wall; a blower housing circumferential wall, the blower housing bottom wall and the blower housing circumferential wall cooperating to at least partially enclose the air flow space and a motor housing area comprised by: a motor housing circumferential wall and a motor housing bottom wall, said motor housing area being enclosed in at least some areas by the air flow space, wherein the blower housing circumferential wall is covered, on an inner side of the blower housing facing the air flow space, in at least some areas, by the at least one hydrocarbon storage element and the blower housing bottom wall is covered in at least some areas by the at least one hydrocarbon storage element on an inner side facing the air flow space, and wherein the motor housing circumferential wall and the motor housing bottom wall are covered in at least some areas by the at least one hydrocarbon storage element on an outer side facing the air flow space.

16. A combustion air blower for a fuel-operated vehicle heater, the combustion air blower comprising:

a blower housing defining an air flow space, said blower housing having an inlet area and a feed area;

a feed wheel arranged with said feed area, said feed wheel and said blower housing being configured to flow combustion air from said inlet area to said feed area;

a motor housing arranged in said blower housing between said inlet area and said feed area, said motor housing being configured to house a motor for driving said feed wheel;

a hydrocarbon storage element arranged in said air flow space between said blower housing and said motor housing, said hydrocarbon storage element being configured to store gaseous hydrocarbon present in the air flow space.

17. The combustion air blower in accordance with claim 16, wherein:

said storage element being spaced from one of said blower housing and said motor housing to define an airflow volume for air flowing from said inlet area to said feed area, said airflow volume being arranged in an interior of said blower housing.

18. The combustion air blower in accordance with claim 17, wherein:

said inlet area has an inlet opening with a smaller flow cross-section than said airflow volume.

* * * * *